(12) United States Patent
Martin et al.

(10) Patent No.: US 12,184,518 B2
(45) Date of Patent: Dec. 31, 2024

(54) METHODS AND SYSTEMS FOR INFERRED INFORMATION PROPAGATION FOR AIRCRAFT PROGNOSTICS

(71) Applicant: THE BOEING COMPANY, Arlington, VA (US)

(72) Inventors: Charles Eugene Martin, Westlake Village, CA (US); Tsai-Ching Lu, Thousand Oaks, CA (US); Steve Slaughter, Scottsdale, AZ (US); Alice A. Murphy, Mesa, AZ (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/366,294

(22) Filed: Aug. 7, 2023

(65) Prior Publication Data

US 2023/0388202 A1 Nov. 30, 2023

Related U.S. Application Data

(63) Continuation of application No. 14/676,542, filed on Apr. 1, 2015, now abandoned.

(51) Int. Cl.
*G06F 16/2458* (2019.01)
*H04L 43/022* (2022.01)
*H04L 43/0823* (2022.01)

(52) U.S. Cl.
CPC ........ *H04L 43/022* (2013.01); *G06F 16/2477* (2019.01); *H04L 43/0823* (2013.01)

(58) Field of Classification Search
None
See application file for complete search history.

(56) References Cited

U.S. PATENT DOCUMENTS

| | | | | |
|---|---|---|---|---|
| 5,841,735 A | * | 11/1998 | Quazi | H04B 11/00 367/131 |
| 2009/0319065 A1 | * | 12/2009 | Risbo | H03H 17/0628 341/61 |

(Continued)

OTHER PUBLICATIONS

Szekely, G. et al.; Measuring and Testing Dependence by Correlation of Distances; The Annals of Statistics; 2007; vol. 35, No. 6; pp. 2769-2794.

(Continued)

*Primary Examiner* — Yu Zhao
(74) *Attorney, Agent, or Firm* — Alleman Hall & Tuttle LLP (57) ABSTRACT

Methods and systems are provided for inferred information propagation for aircraft prognostics. The method includes receiving, by a processor, an original time-series of data points for a component as an input; preprocessing the input to divide the original time-series of data into subsets of data by applying a time-window over the original time-series of data points; and computing, by the processor, a Mutual Information (MI) value for each pair of variables within each subset of data. The method also includes constructing, by the processor, a sequence of relationship graphs using the computed MI values; clustering, by the processor, each relationship graph; and analyzing, by the processor, the time-ordered sequence of clustered relationship graphs to identify features in the component.

20 Claims, 6 Drawing Sheets

(56) References Cited

U.S. PATENT DOCUMENTS

2013/0318011 A1* 11/2013 Jones ................ G05B 23/0243
706/12
2016/0148103 A1* 5/2016 Sarrafzadeh ........... G06N 20/00
706/46

OTHER PUBLICATIONS

Rosvall, M. et al.; The Map Equation; Eur. Phys. J. Special Topics; Sep. 23, 2009; vol. 178, No. 13; pp. 1-9.
Rosvall, M. et al.; Mapping Change in Large Networks; PLoS One; Oct. 6, 2010; pp. 1-10.
Ronhovde, P. et al.; Detecting Hidden Spatial and Spatio-Temporal Structures in Glasses and Complex Physical Systems by Multiresolution Network Clustering; Cond-Mat.MTRL-SCI; Apr. 4, 2011; pp. 1-29.
Reshef, D. et al.; Equitability Analysis of the Maximal Information Coefficient, with Comparisons; http://arxiv.org; Aug. 14, 2013; pp. 1-22.
Reshef, D. et al.; Detecting Novel Associations in Large Data Sets; www.sciencemag.org; Dec. 16, 2011; vol. 334; pp. 1518-1524.
Kraskov, A. et al.; Estimating Mutual Information; Physical Review E. 69; Feb. 2, 2008; pp. 1-16.
Koujaku, S. et al.; Structural Change Point Detection for Evolutional Networks; Proceeding of the World Congress on Engineering; Jul. 3-5, 2015; vol. 1; pp. 1-6.
Kinney, J. et al.; Equitability, Mutual Information, and the Maximal Information Coefficient; PNAS; Mar. 4, 2014; vol. 111, No. 9; pp. 3354-3359.
Huo, X. et al.; A Survey of Manifold-Based Learning Methods; Recent Advances in Data Mining of Enterprise Data; 2009; pp. 691-745.
Holme, P. et al.; Temporal Networks; Dec. 16, 2011; pp. 1-28.
Breiman, L. et al.; Estimating Optimal Transformations for Multiple Regression and Correlation; Journal of American Statistical Association; Sep. 1985; vol. 80, No. 391; pp. 580-598.
Eqlimi, Ehsan et al., Mutual Information Weighted Graphs for Resting State Functional Connectivity in fMRI Data, Jan. 2014.
Kugiumtzis, Dimetrie et al, Measures of Analysis of Time Series (MATS): A MATLAB Toolkit for Computation of Multiple Measures on Time Series Data Bases, Jan. 2010.

* cited by examiner

METHODS AND SYSTEMS FOR INFERRED INFORMATION PROPAGATION FOR AIRCRAFT PROGNOSTICS

CROSS-REFERENCE TO RELATED APPLICATIONS

This application is a continuation of U.S. patent application Ser. No. 14/676,542 titled Methods and Systems for Inferred Information Propagation for Aircraft Prognostics, filed on Apr. 1, 2015, the entire contents of which are hereby incorporated herein by reference.

BACKGROUND

The field of the disclosure relates generally to aircraft prognostics, and more specifically, to methods and systems for inferred information propagation for aircraft prognostics.

Vehicles, particularly commercial air, marine and land vehicles, typically include some type of performance monitoring system that records data regarding the vehicle performance, which includes the performance of the various systems and subsystems of the vehicle. The data include a record of certain performance events that occur during the operation of the vehicle. The performance monitoring system typically conducts data collection and reports all of the collected data to the user. The user then may utilize the data in determining the type of maintenance, if any, that the vehicle may need. For example, if the data indicate that a particular component of the vehicle is malfunctioning or that the performance of one or more components may contribute to a vehicle failure in the future, then the user can perform the appropriate maintenance on the vehicle at the next opportunity.

For example, an air vehicle typically has a central maintenance computer (CMC). The CMC collects, consolidates and reports performance data for the components of the air vehicle. At least some known Airplane Health Management (AHM) solutions use only airplane maintenance, fault repairs, and out, off, on, in (OOOI) data, which is limited to providing reactive diagnosis where the detection of fault, attribution of root causes, and repairs are done after the critical transition of a fault. While exploitation of this data has been successful, it is a small fraction of the total amount of data available. For example, in an 8-hour flight, at least one known commercial aircraft generates approximately 59 Megabytes of data captured by the CMC. Of this, only about 0.3 Megabytes of data are transferred to the AHM. Accordingly, the capabilities of the existing AHM solutions to gather and exploit such data for real-time, in-flight prognosis are limited and could be improved.

BRIEF DESCRIPTION

In one implementation, a method of inferred information propagation for aircraft prognostics is provided. The method includes receiving, by a processor, an original time-series of data points for a component as an input; preprocessing the input to divide the original time-series of data into subsets of data by applying a time-window over the original time-series of data points; and computing, by the processor, a Mutual Information (MI) value for each pair of variables within each subset of data. The method also includes constructing, by the processor, a sequence of relationship graphs using the computed MI values; clustering, by the processor, each relationship graph; and analyzing, by the processor, the time-ordered sequence of clustered relationship graphs to identify features in the component.

In another implementation, a prognosis system for inferred information propagation for aircraft prognostics is provided. The prognosis system includes a memory for storing data and a processor in communication with the memory. The processor is programmed to receive an original time-series of data points for a component as an input, preprocess the input to divide the original time-series of data into subsets of data by applying a time-window over the original time-series of data points, and compute a Mutual Information (MI) value for each pair of variables within each subset of data. The processor is also programmed to construct a sequence of relationship graphs using the computed MI values, cluster each relationship graph, and analyze the time-ordered sequence of clustered relationship graphs to identify features in the component.

In yet another implementation, one or more non-transitory computer-readable storage media having computer-readable instructions encoded thereon are provided. When executed by a processor, the computer-readable instructions cause the processor to receive an original time-series of data points for a component as an input, preprocess the input to divide the original time-series of data into subsets of data by applying a time-window over the original time-series of data points, compute a Mutual Information (MI) value for each pair of variables within each subset of data, construct a sequence of relationship graphs using the computed MI values, cluster each relationship graph, and analyze the time-ordered sequence of clustered relationship graphs to identify features in the component.

DETAILED DESCRIPTION

Figure 1:
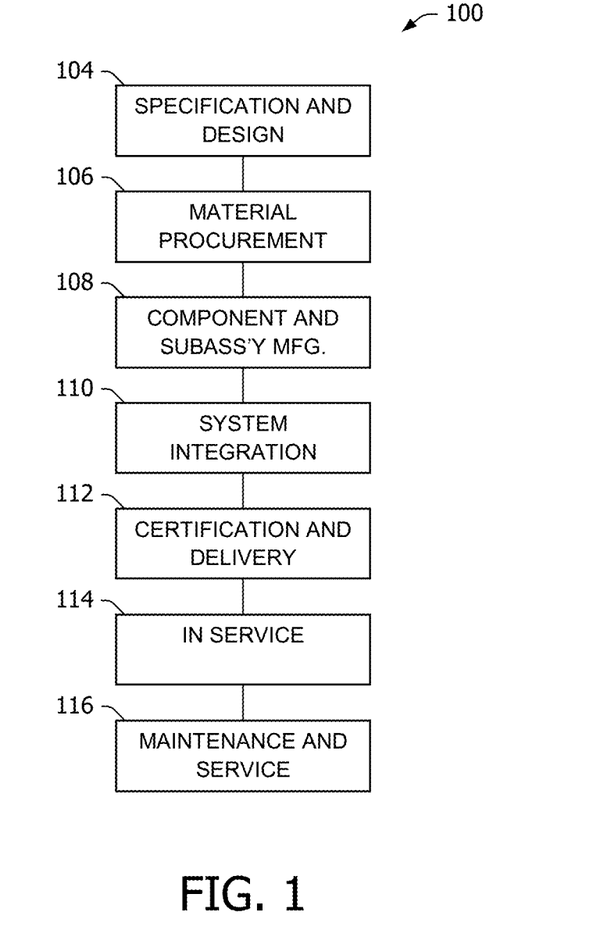
FIG. 1 is a flow diagram of an exemplary aircraft production and service methodology.
Figure 2:
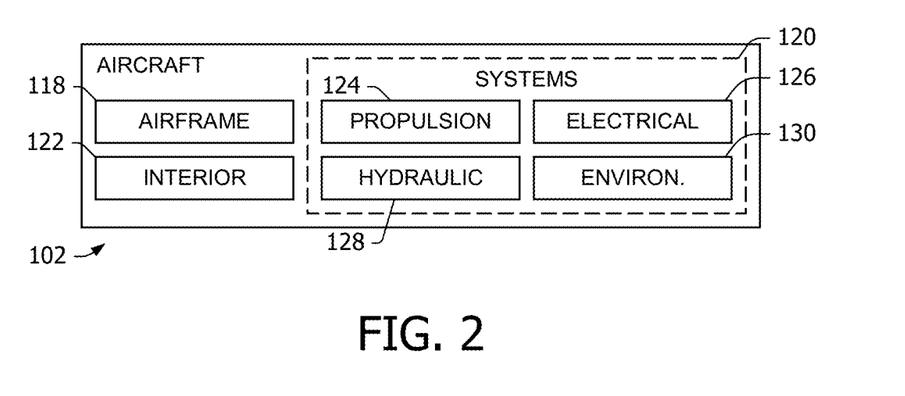
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104, data of aircraft 102 may be used during the manufacturing process and other materials associated with the airframe may be procured 106. During production, component and subassembly manufacturing 108 and system integration 110 of the aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, an aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included. Although an aircraft example is shown, the principles of the invention may be applied to non-aviation industries, such as the automotive industry and/or other service industries that employ troubleshooting methodologies.

Systems and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

Figure 3:
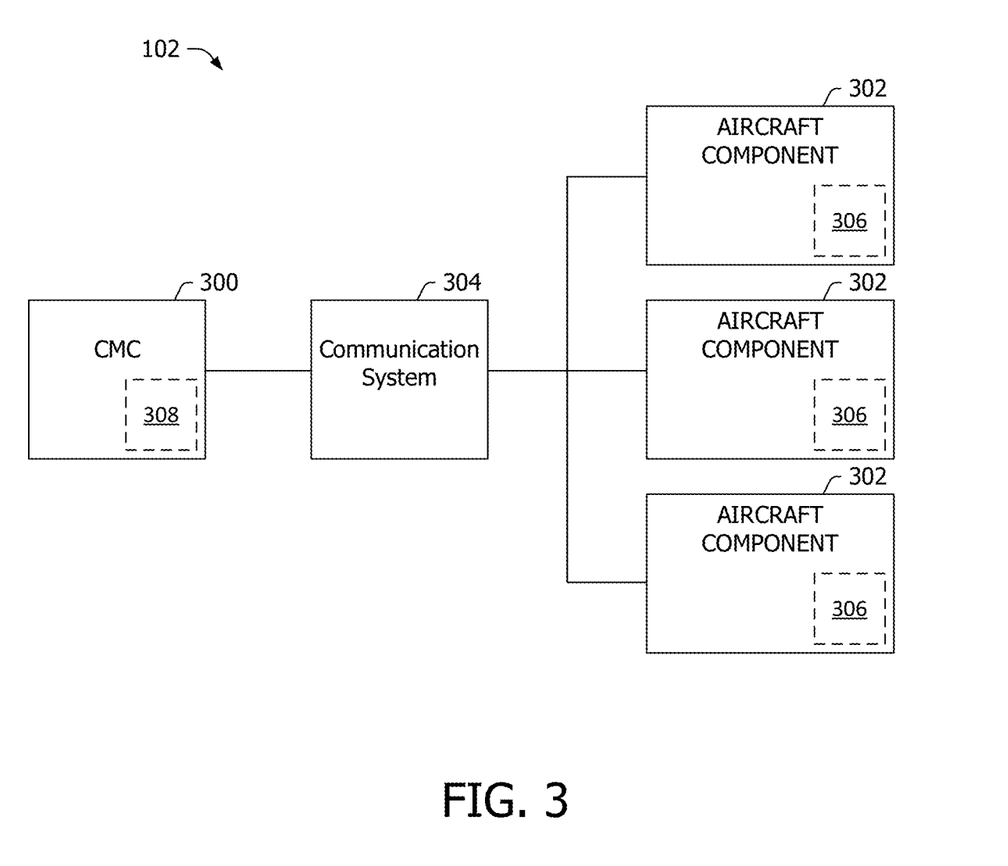
FIG. 3 is a block diagram of aircraft including a central maintenance computer (CMC).

FIG. 3 is a block diagram of aircraft 102 including a central maintenance computer (CMC) 300. In the exemplary implementation, aircraft 102 includes CMC 300, aircraft components 302, and a communication system 304. CMC 300 includes data processing, transfer, and storage means. CMC 300 is coupled to aircraft components 302 via communication system 304.

Each aircraft component 302 includes at least one sensor 306 for measuring various aspects of the states of aircraft component 302. Aircraft component fault data are generated by aircraft component 302 continuously during startup and flight. The fault data is transmitted to CMC 300 via communication system 304. The fault data is processed by CMC 300 to predict impending component failures. Preferably, CMC 300 continuously receives and processes fault data received from communication system 304 during flight. Other aircraft system operating parameters such as time, flight number, etc., are collected via communication system 304 or are self-generated by CMC 300.

Most aircraft components 302 are connectable to communication system 304. Thus, a complete set of fault data is collected and processed by CMC 300 of the present invention. Communication system 304 is a means of communicating any type of information to and from CMC 300 and aircraft components 302. This information may be in a variety of forms. For example, analog signals (variable voltage, current, and frequency), discrete wire status (open or ground), and serial digital data (per ARINC 429) may be processed by communication system 304. Processing of other forms of communication, such as radio signaling, may also be incorporated into communication system 304.

In the exemplary implementation, CMC 300 includes a prognostics system 308 for inferred information propagation for aircraft prognostics. Prognostics system 308 enables extraction of features from large groups of noisy variables to enhance the prediction of impending component failures within aircraft subsystems. Aircraft 102 has a wide array of different subsystems. Each subsystem includes different aircraft components 302, and sensors 306 measure various aspects of the states of aircraft components 302. Prognostics system 308 uses the measurements of these variables to infer the states and operating characteristics of the subsystems. Underlying causal mechanisms exist within and between subsystems, and induce statistical dependencies among the measured variables. Prognostics system 308 extracts these dependencies and organizes them into features that are used to tease out subtle signals that indicate shifts in the operating characteristics of aircraft components 302. These shifts often indicate impending component failures, and the signals also carry information regarding remaining useful life.

Figure 4:
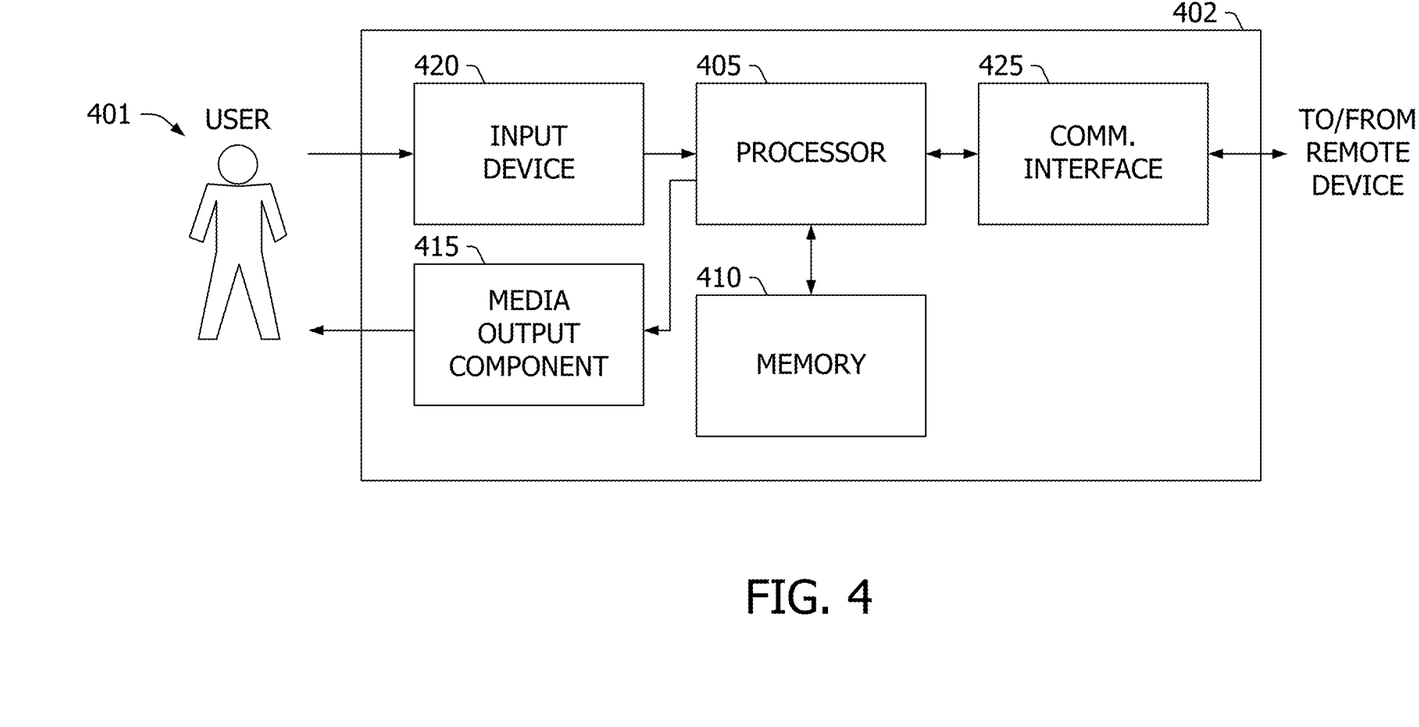
FIG. 4 illustrates an exemplary configuration of a computing device.

FIG. 4 illustrates an example configuration of a computing device 402. Computing device 402 is representative of CMC 300 as shown in FIG. 3. Referring specifically to FIG. 4, computing device 402 includes a processor 405 for executing instructions. In some implementations, executable instructions are stored in a memory 410. Processor 405 includes one or more processing units (e.g., in a multi-core configuration). Memory 410 is any device allowing information such as executable instructions and/or data to be stored and retrieved. Memory 410 may include one or more computer readable storage devices or other computer readable media, including transitory and non-transitory computer readable media.

Computing device 402 also includes at least one media output component 415 for presenting information to user 401. Media output component 415 is any component capable of conveying information to user 401. In some implementations, media output component 415 includes an output adapter such as a video adapter and/or an audio adapter. An output adapter is operatively coupled to processor 405 and is operatively coupled to an output device such as a display device (e.g., a liquid crystal display (LCD), organic light emitting diode (OLED) display, cathode ray tube (CRT), or "electronic ink" display) or an audio output device (e.g., a speaker or headphones). In some implementations, at least one such display device and/or audio device is included in media output component 415.

In some implementations, computing device 402 includes an input device 420 for receiving input from user 401. Input device 420 may include, for example, a keyboard, a keypad, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 415 and input device 420.

Still referring to FIG. 4, computing device 402 may also include a communication interface 425, which is communicatively couplable to a remote computing device such as a group of servers. Communication interface 425 includes, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory 410 are, for example, processor-executable instructions for providing a user interface to user 401 via media output component 415 and, optionally, receiving and processing input from input device 420. Memory 410 includes, but is not limited to, any computer-operated hardware suitable for storing and/or retrieving computer-executable instructions and/or data. Memory 410 may include random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). Further, memory 410 may include multiple storage units such as hard disks or solid state disks in a redundant array of inexpensive disks (RAID) configuration. Memory 410 may include a storage area network (SAN) and/or a network attached storage (NAS) system. In some implementations, memory area 410 includes memory that is integrated in mobile computing device 402. For example, mobile computing device 402 may include one or more hard disk drives as memory 410. Memory 410 may also include memory that is external to mobile computing device 402 and may be accessed by a plurality of computing devices 402. The above memory types are exemplary only, and are thus not limiting as to the types of memory usable for storage of processor-executable instructions and/or data.

Figure 5:
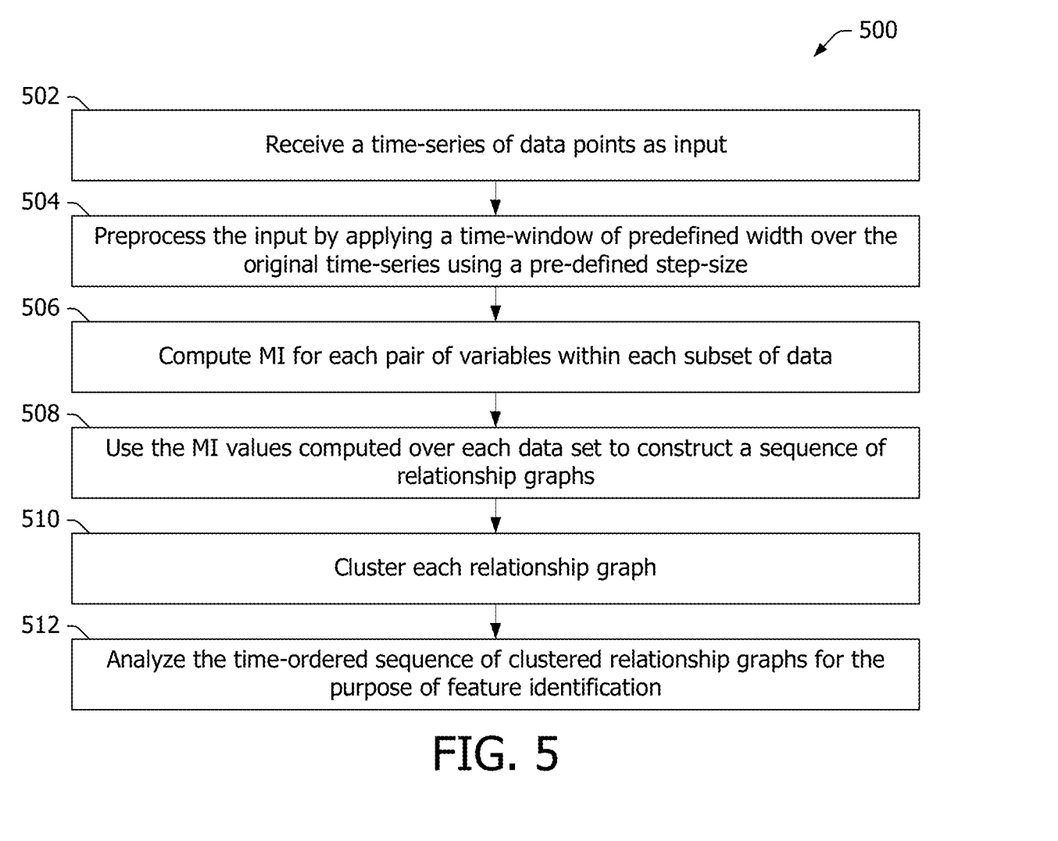
FIG. 5 is a flowchart of an exemplary method for inferred information propagation for aircraft prognostics.

FIG. 5 is a flowchart of an exemplary method 500 for inferred information propagation for aircraft prognostics. In the exemplary implementation, method 500 is implemented by prognostics system 308 (shown in FIG. 3), or more specifically, by processor 405 of prognostics system 308. Initially, prognostics system 308 receives a time-series of data points as input (block 502). The data points may come from continuous variables, discrete variables, or a mixture of the two. The data may be either ordinal or nominal.

Figure 6:
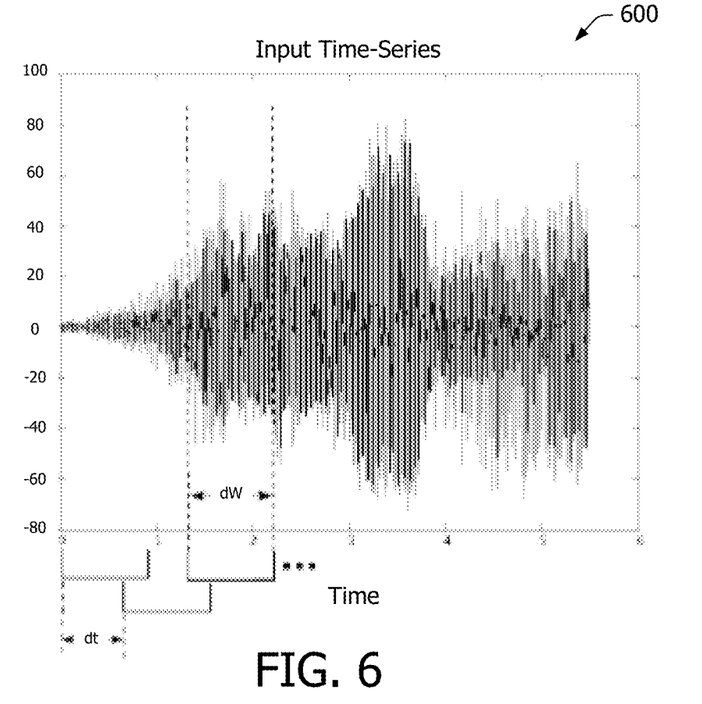
FIG. 6 is an exemplary graph illustrating preprocessing of an input time-series.

FIG. 6 is an exemplary graph 600 illustrating preprocessing of an input time-series (block 504 of FIG. 5). Referring to FIGS. 3, 5 and 6, prognostics system 308 preprocesses 504 the input by applying a time-window of predefined width over the original time-series using a pre-defined step-size (block 504). If the variables are measured using different sampling rates, then prognostics system 308 converts the original time-series to a time-series in which all variables are sampled at the same rate. This may be accomplished by down-sampling the measurements for variables with sampling rates that are too high and/or interpolating the measurements of variables with sampling rates that are too low. Prognostics system 308 then divides the original time-series of data into intervals (subsets) by applying a time-window of predefined width over the original time-series using a pre-defined step-size. This enables generation of a time-series of relationship graphs.

With reference to FIG. 6, in the exemplary implementation, dW is the pre-defined width in discrete time-units of the time-window (interval) and dt is the pre-defined step-size by which the window is incremented. The left boundary of the window is initially placed at t=0 and the right boundary at t=dW. The data that falls within this interval forms the first subset. The position of the window is then moved forward in time by the amount dt, which produces the second subset of data. This procedure of incrementing the time-window continues over the entire time-series to produce a time-ordered sequence of data subsets that are used to compute the MI values.

There are a number of factors that should be considered when selecting appropriate values for dt and dW. First, the value of dW must be large enough so that the time-windows include enough points to produce accurate MI calculations. Second, the value of dW should be small enough so that important transient effects are not washed out. Lastly, the value of dt should be made as small as is computationally feasible, but no larger than dW. If dt is too large, then there is an increased risk of skipping over periods of data that contain important shifts in relationship strengths. Alternatively, for high sampling rates, a small value for dt may lead to infeasible computational requirements and is likely unnecessary from an analysis perspective.

Referring again to FIGS. 3, 5, and 6, in the exemplary implementation, prognostics system 308 computes Mutual Information (MI) for each pair of variables within each subset of data (block 506). In the exemplary implementation, prognostics system 308 uses MI as a measure of relationship strength due to its high degree of generality and equitability. However, in alternative implementations, the system may use any other measure of relationship strength, for example, Maximal Information Coefficient and Distance Correlation. There are a wide variety of different techniques for computing MI for discrete, continuous, and ordinal variables, any of which may be used by prognostics system 308.

In the exemplary implementation, prognostics system 308 implements a non-parametric method based on the k-Nearest-Neighbors algorithm. This method utilizes the basic fact that for a given set of samples, from a probability distribution, those samples that live in high density regions of the sample space are more likely to have close nearest neighbors, while the opposite is true for those in low density regions. Computing MI values includes receiving the sequence of data subsets generated in the preprocessing step as input. For each subset, the relationship strengths among all pairs of variables are computed. The relationship strength is measured by the MI.

In the exemplary implementation, prognostics system 308 uses the MI values computed over each data set to construct a sequence of relationship graphs (block 508). A relationship graph is constructed by interpreting each variable as a node in the graph, placing an undirected edge between each node, and then setting the weights on the edges to the corresponding MI values. That is, given a variable x and a variable y, the weight on the edge between the two corresponding nodes is equal to $MI(x,y)=MI(y,x)$. There is one relationship graph per subset of data, and the temporal ordering of these subsets induces a sequence on the set of relationship graphs. In the exemplary implementation, prognostics system 308 then clusters each relationship graph (block 510).

Prognostics system 308 analyzes the time-ordered sequence of clustered relationship graphs for the purpose of feature identification (block 512). The analysis includes searching for changes in the structure and characteristics of clusters over time as indicators of shifts in the operating state of the underlying aircraft subsystem. Cluster dynamics include phenomena such as cluster formation, annihilation, division, and merging. The sets of variables (nodes) involved in these dynamics are the extracted features. In addition to visual inspection, a wide variety of different algorithms may be employed for this purpose including, for exemplary purposes only, a statistical test for detecting changes in the structures and strengths of clusters over time based on spectral analysis. The resulting features are sets of variables upon which further analysis can be performed in order to predict impending component failures in aircraft subsystems.

The number of possible sets of variables (features) that can be analyzed for prognostics grows combinatorially quickly in the total number of variables being considered. Given the large numbers of variables involved in aircraft subsystems and the subtle nature of many of the signals that are useful for prognostics, manual extraction of features is infeasible, as is exhaustive analysis of all sets of potentially interesting variables. For these reasons, prognostics system 308 incorporates a network-based feature selection approach. In particular, prognostics system 308 employs graph-clustering techniques as a way of mitigating these difficulties. A cluster of nodes (variables) is indicative of a set of variables that exhibit significantly strong statistical dependencies, and with the present method, these features can be extracted without having to consider the full joint probability distributions over all sets of variables. Prognostics system 308 does not depend on any particular graph-clustering technique. It only requires an algorithm that is capable of finding such structure within a weighted, undirected graph. For example, prognostics system 308 may use a force-directed method or an information-theoretic approach.

The following example is provided for exemplary purposes only and should not be construed as limiting the implementations described herein to the specific components and/or variables described herein. In the exemplary implementation, this example illustrates how prognostics system 308 is capable of extracting useful features from noisy, real-world data of a blower going through various stages of improper functioning.

Initially, prognostics system 308 receives blower (or axial vane fan) data as the raw input time-series of data points. The blower data is measured from seven variables: three phases of current (IA, IB, IC), three phases of voltage (VA, VB, VC), and a reading from an accelerometer ('Acc'). The accelerometer Acc measures vibrations exhibited by the blower. Such vibrations are known indicators of blower wear/damage.

Prognostics system 308 divides the time-series of data points into nine different subsets. Each subset corresponds to data collected during a different stage of improper functioning. Prognostics system 308 then computes the Mutual Information between each pair of variables for each of the nine subsets of data. The resulting sets of MI values are then used to generate nine relationship graphs, one graph per subset of data.

Figure 7:
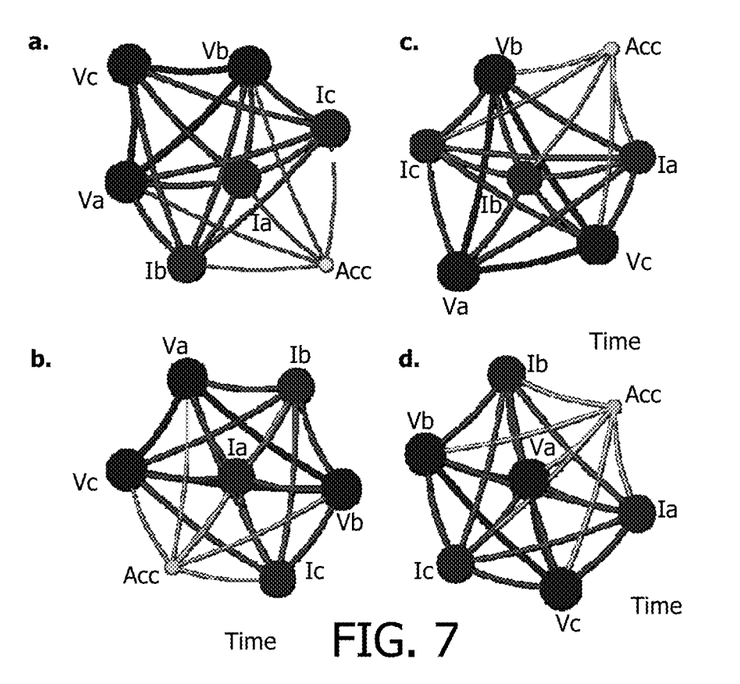
FIG. 7 illustrates clustered relationship graphs representing MI values for four subsets of data determined by prognostics system.

Continuing with the example, FIG. 7 illustrates clustered relationship graphs representing MI values for four subsets of data determined by prognostics system 308. The clustered relationship graphs are output by prognostics system 308 and are analyzed for features. The primary feature evident from these graphs through visual inspection is the increasing importance of the acceleration with respect to the other nodes (variables) as the improper functioning of the blower increases. This is seen by noting that the acceleration node's color becomes lighter and its incident edges become thicker as we move from sub-figure a to sub-figure d. Viewed another way, prognostics system 308 cues the voltages and currents (the currents in particular) as key features because they carry information about the acceleration. This suggests that voltage and current measurements may be used in lieu of direct measurements of acceleration in order to infer the degree of wear of the blower.

Figure 8:
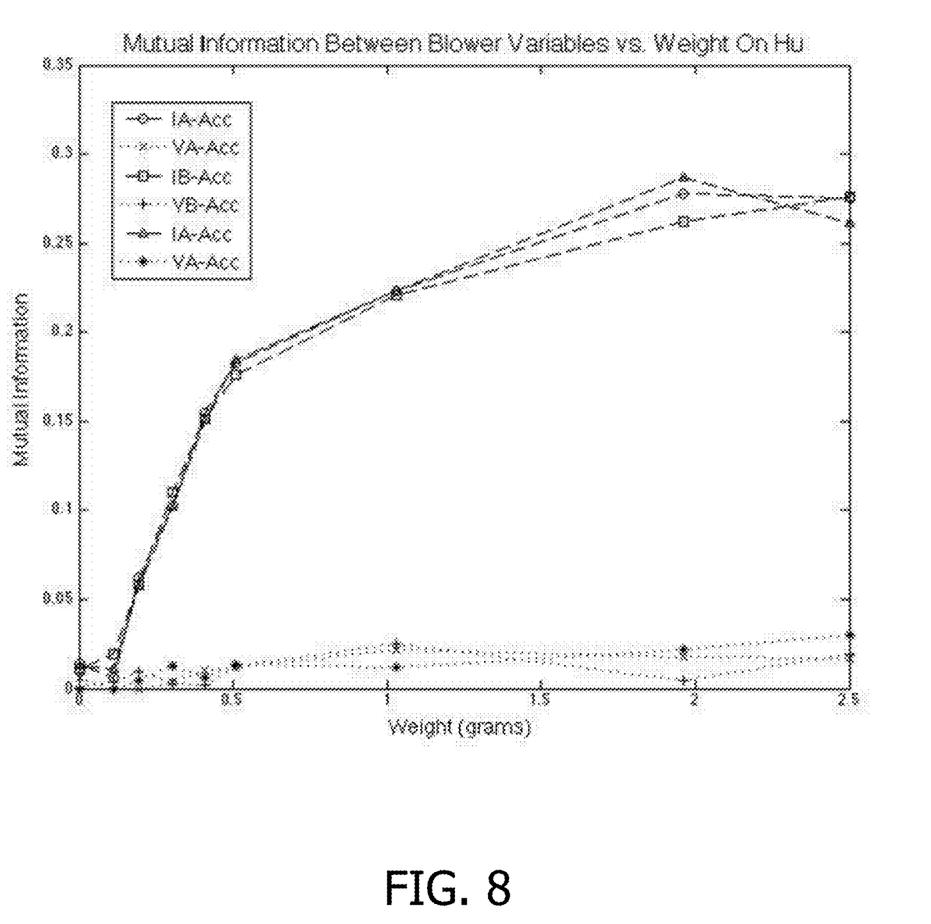
FIG. 8 illustrates relationships between the MI values of variable pairs involving acceleration and weight on the blower hub.

FIG. 8 illustrates relationships between the MI values of variable pairs involving acceleration and weight on the blower hub. In the exemplary implementation, as the improper functioning of the blower increases, there is increasing coupling (MI value) between the acceleration and other variables, especially the currents.

The systems and methods described herein enable extraction of features from large groups of noisy variables to enhance the prediction of impending component failures within aircraft subsystems. An aircraft has a wide array of different subsystems. Each subsystem includes different components, and sensors measure various aspects of the states of certain components. The measurements of these variables are used to infer the states and operating characteristics of the subsystems. Underlying causal mechanisms exist within and between subsystems, and induce statistical dependencies among the measured variables. The systems and methods described herein extract these dependencies and organize them into features that are used to tease out subtle signals that indicate shifts in the operating characteristics of aircraft components. These shifts often indicate impending component failures, and the signals also carry information regarding remaining useful life.

The systems and methods described herein provide an innovative use of MI in order to ascertain pairwise relationship strengths among the variables within an aircraft. MI has a high degree of generality, so it is not restricted to detecting only specific types of relationships, such as linear, oscillatory, or functional. Additionally, MI is highly equitable, so given large enough sample sizes for any two classes of relationships with the same degree of noise, the MI value will be the same for each relationship.

Generality and equitability are typically difficult attributes to ensure, but MI comes closer than any other statistic of relationship strength. The systems and methods described herein extract features by considering only pairwise relationship strengths and then infer significant higher order relationships through graph-clustering. This enables the systems and methods described herein to effectively and efficiently extract features from very high-dimensional spaces. That is, unlike many previous techniques, the systems and methods avoid the pitfall of attempting to directly consider the many different possible combinations of variables, which grows combinatorially quickly in the number of variables. Finally, unlike many past techniques that rely on a single static graph for feature extraction, the systems and methods described herein make use of the dynamics of clusters observable in a time-series of graphs in order to ascertain the most relevant features for detecting shifts in the operating characteristics of the underlying system.

An exemplary technical effect of the methods and systems described herein includes at least one of: (a) receiving an original time-series of data points for a component as an input; (b) preprocessing the input to divide the original time-series of data into subsets of data by applying a time-window over the original time-series of data points; (c) computing a Mutual Information (MI) value for each pair of variables within each subset of data; (d) constructing a sequence of relationship graphs using the computed MI values; (e) clustering each relationship graph; (f) and analyzing the time-ordered sequence of clustered relationship graphs to identify features in the component.

As compared to known methods and systems for troubleshooting devices, the methods and systems described herein provide troubleshooting charts tailored to each user's technical background and past usage. The methods and systems described herein also provide troubleshooting charts that are customized to different physical and/or environmental conditions, where different solutions to a problem may be used. The personalization of a troubleshooting chart to a user enables the user to employ corrective actions for a fault that have the highest probability of success, resulting in greater efficiency and reduced time, cost, and danger of the maintenance process.

Implementations of the systems and methods described herein may embrace one or more computer-readable media, wherein each medium may be configured to include or includes thereon data or computer-executable instructions for manipulating data. The computer-executable instructions include data structures, objects, programs, routines, or other program modules that may be accessed by a processing system, such as one associated with a general-purpose computer capable of performing various different functions or one associated with a special-purpose computer capable of performing a limited number of functions. Computer-executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer-readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

The methods described herein may be encoded as executable instructions embodied in a computer readable medium, including, without limitation, a storage device or a memory of a computing device. Such instructions, when executed by one or more processors, cause the processor(s) to perform at least a portion of the methods described herein. As used herein, a "storage device" is a tangible article, such as a hard drive, a solid state memory device, and/or an optical disk that is operable to store data, such as computer-executable instructions.

The description of the different advantageous implementations has been presented for purposes of illustration and description, and is not intended to be exhaustive or limited to the implementations in the form disclosed. Many modifications and variations will be apparent to those of ordinary skill in the art. Further, different advantageous implementations may provide different advantages as compared to other advantageous implementations. The implementation or implementations selected are chosen and described in order to best explain the principles of the implementations, the practical application, and to enable others of ordinary skill in the art to understand the disclosure for various implementations with various modifications as are suited to the particular use contemplated.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of predicting a failure of a component of an aircraft in real-time, said method comprising:
    receiving, by a processor, respective original time-series of data points for the component as an input from a plurality of sensors on the aircraft, wherein the respective original time-series of data points are derived from data generated in-flight, and wherein the respective original time-series of data points comprise variables including at least one current feature, at least one voltage feature, and at least one accelerometer feature;
    preprocessing, by the processor, the respective original time-series to define a plurality of overlapping time windows over which the respective original time-series are divided, thereby defining respective subsets of data for each of the plurality of overlapping time windows, wherein the respective subsets of data for each of the plurality of overlapping time windows comprises two or more data points;
    computing, by the processor, a Mutual Information (MI) value for each pair of the variables within each of the respective subsets of data of the respective original time-series;
    constructing, by the processor, a time-series of relationship graphs having weights corresponding to the MI values and ordered over the plurality of overlapping time windows, wherein nodes of the relationship graphs correspond to the variables and edges of the relationship graphs correspond to the weights corresponding to the MI values;
    clustering, by the processor, the relationship graphs for each of the plurality of overlapping time windows, thereby defining a time-series of clusters, wherein the relationship graphs are clustered based on statistical dependencies of the variables of the relationship graphs;
    detecting a change over time in at least one of the weights or a structure of the time-series of clusters, wherein the change is detected in-flight, and wherein the change corresponds to increased coupling between at least two of the variables, indicating a change in a condition of the component of the aircraft; and
    identifying, in-flight to a user, the change as a feature corresponding to at least two of the respective original time-series from which the change originated and alerting the user to a potential predicted failure of the component of the aircraft based on the feature.

2. The method in accordance with claim 1, wherein preprocessing the respective original time-series further comprises defining a width for the plurality of overlapping time windows and a time step between each successive window of the plurality of overlapping time windows, wherein the width is greater than the time step.

3. The method in accordance with claim 2, further comprising:
    placing a first time window of the plurality of overlapping time windows at a first time to define a first subset of the respective subsets of data; and
    placing a second time window at a second time offset from the first time by the time step to define a second subset of the respective subsets of data.

4. The method in accordance with claim 1, wherein preprocessing the respective original time-series further comprises converting the respective original time-series to a plurality of time-series in which all time-series are sampled at a same rate.

5. The method in accordance with claim 4, wherein converting the respective original time-series further comprises at least one of down-sampling measurements for time-series having sampling rates that are too high and interpolating measurements for time-series having sampling rates that are too low.

6. The method in accordance with claim 1, wherein constructing the time-series of relationship graphs further comprises:
defining each of the respective original time-series as a node in at least one of the relationship graphs;
placing an undirected edge between each node; and
assigning the weights corresponding to the MI value to the undirected edges between the corresponding nodes.

7. The method in accordance with claim 1, wherein detecting the change over time further comprises detecting at least one of cluster formation, annihilation, division, and merging in the time-series of clusters.

8. A prognosis system for predicting a failure of a component of an aircraft in real-time, said prognosis system comprising:
a memory for storing data; and
a processor in communication with said memory, said processor programmed to:
receive respective original time-series of data points for the component as an input from a plurality of sensors on the aircraft, wherein the respective original time-series of data points are derived from data generated in-flight, and wherein the respective original time-series of data points comprise variables including at least one current feature, at least one voltage feature, and at least one accelerometer feature;
preprocess the respective original time-series to define a plurality of overlapping time windows over which the respective original time-series are divided, thereby defining respective subsets of data for each of the plurality of overlapping time windows, wherein the respective subsets of data for each of the plurality of overlapping time windows comprises two or more data points;
compute a Mutual Information (MI) value for each pair of the variables within each of the respective subsets of data of the respective original time-series;
construct a time-series of relationship graphs having weights corresponding to the MI values and ordered over the plurality of overlapping time windows, wherein nodes of the relationship graphs correspond to the variables and edges of the relationship graphs correspond to the weights corresponding to the MI values;
cluster the relationship graphs for each of the plurality of overlapping time windows, thereby defining a time-series of clusters, wherein the relationship graphs are clustered based on statistical dependencies of the variables of the relationship graphs;
detect a change over time in at least one of the weights or a structure of the time-series of clusters, wherein the change is detected in-flight, and wherein the change corresponds to increased coupling between at least two of the variables, indicating a change in a condition of the component of the aircraft; and
identify, in-flight to a user, the change as a feature corresponding to at least two of the respective original time-series from which the change originated and alert the user to a potential predicted failure of the component of the aircraft based on the feature.

9. The prognosis system in accordance with claim 8, wherein the processor is further programmed, in preprocessing the respective original time-series, to define a width for the plurality of overlapping time windows and a time step between each successive window of the plurality of overlapping time windows, wherein the width is greater than the time step.

10. The prognosis system in accordance with claim 9, wherein said processor is further programmed to:
place a first time window of the plurality of overlapping time windows at a first time to define a first subset of the respective subsets of data; and
place a second time window at a second time offset from the first time by the time step to define a second subset of the respective subsets of data.

11. The prognosis system in accordance with claim 8, wherein said processor is further programmed, in preprocessing the respective original time-series, to convert the respective original time-series to a plurality of time-series in which all time-series are sampled at a same rate.

12. The prognosis system in accordance with claim 11, wherein to convert the respective original time-series, said processor is further programmed to at least one of downsample measurements for time-series having sampling rates that are too high and interpolate measurements for time-series having sampling rates that are too low.

13. The prognosis system in accordance with claim 8, wherein to construct the time-series of relationship graphs, said processor is further programmed to:
define each of the respective original time-series as a node in at least one of the relationship graphs;
place an undirected edge between each node; and
assign the weights corresponding to the MI value to the undirected edges between the corresponding nodes.

14. The prognosis system in accordance with claim 8, wherein to detect the change over time, the processor is further programmed to detect at least one of cluster formation, annihilation, division, and merging in the time-series of clusters.

15. One or more non-transitory computer-readable storage media having computer-readable instructions encoded thereon, wherein when executed by a processor, said computer-readable instructions cause the processor to:
receive respective original time-series of data points for a component of an aircraft as an input from a plurality of sensors on the aircraft, wherein the respective original time-series of data points are derived from data generated in-flight, and wherein the respective original time-series of data points comprise variables including at least one current feature, at least one voltage feature, and at least one accelerometer feature;
preprocess the respective original time-series to define a plurality of overlapping time windows over which the respective original time-series are divided, thereby defining respective subsets of data for each of the plurality of overlapping time windows, wherein the respective subsets of data for each of the plurality of overlapping time windows comprises two or more data points;
compute a Mutual Information (MI) value for each pair of the variables within each of the respective subsets of data of the respective original time-series;
construct a time-series of relationship graphs having weights corresponding to the MI values and ordered over the plurality of overlapping time windows, wherein nodes of the relationship graphs correspond to the variables and edges of the relationship graphs correspond to the weights corresponding to the MI values;

cluster the relationship graphs for each of the plurality of overlapping time windows, thereby defining a time-series of clusters, wherein the relationship graphs are clustered based on statistical dependencies of the variables of the relationship graphs;

detect a change over time in at least one of the weights or a structure of the time-series of clusters, wherein the change is detected in-flight, and wherein the change corresponds to increased coupling between at least two of the variables, indicating a change in a condition of the component of the aircraft; and identify, in-flight to a user, the change as a feature corresponding to at least two of the respective original time-series from which the change originated and alert the user to a potential predicted failure of the component of the aircraft based on the feature.

16. The one or more non-transitory computer-readable storage media in accordance with claim 15, wherein the instructions further program the processor to define a width for the plurality of overlapping time windows and a time step between each successive window of the plurality of overlapping time windows, wherein the width is greater than the time step.

17. The one or more non-transitory computer-readable storage media in accordance with claim 15, wherein the processor is further programmed to construct the time-series of relationship graphs by:
defining each of the respective original time-series as a node in at least one of the relationship graphs;
placing an undirected edge between each node; and
assigning the weights corresponding to the MI value to the undirected edges between the corresponding nodes.

18. The one or more non-transitory computer-readable storage media in accordance with claim 17, wherein to detect the change over time the processor is further programmed to detect at least one of cluster formation, annihilation, division, and merging in the time-series of clusters.

19. The one or more non-transitory computer-readable storage media in accordance with claim 15, wherein the processor is further programmed to convert the respective original time-series to a plurality of time-series in which all time-series are sampled at a same rate.

20. The one or more non-transitory computer-readable storage media in accordance with claim 19, wherein the processor is further programmed to at least one of down-sample measurements for time-series having sampling rates that are too high and interpolate measurements for time-series having sampling rates that are too low.

* * * * *